(12) United States Patent  (10) Patent No.: US 7,748,660 B2
Hendrickson et al.  (45) Date of Patent: Jul. 6, 2010

(54) FIBER OPTIC RAPID SPOOLING TOOL

(75) Inventors: Daniel Hendrickson, Roswell, GA (US); Hongbo Zhang, Duluth, GA (US); Rathindra Nahar, Suwanee, GA (US)

(73) Assignee: OFS Fitel, LLC, Norcross, GA (US)

( * ) Notice: Subject to any disclaimer, the term of this patent is extended or adjusted under 35 U.S.C. 154(b) by 231 days.

(21) Appl. No.: 11/983,171

(22) Filed: Nov. 7, 2007

(65) Prior Publication Data

US 2008/0315030 A1   Dec. 25, 2008

Related U.S. Application Data

(60) Provisional application No. 60/945,611, filed on Jun. 22, 2007.

(51) Int. Cl.
 *B65H 16/00* (2006.01)
(52) U.S. Cl. ............... 242/588.3; 242/588.6; 242/590; 242/597.1; 242/597.4; 242/406
(58) Field of Classification Search .......... 242/588, 242/588.3, 588.4, 588.6, 590, 597, 597.1, 242/597.2, 597.3, 597.4, 404, 406; 385/134, 385/135
See application file for complete search history.

(56) References Cited

U.S. PATENT DOCUMENTS

| | | | | |
|---|---|---|---|---|
| 2,613,041 A * | 10/1952 | Cantrell | ................. | 242/423.1 |
| 3,079,099 A * | 2/1963 | Blain | .................. | 242/597.5 |
| 3,612,424 A * | 10/1971 | Friedel | ................. | 242/348.4 |
| 3,857,526 A * | 12/1974 | Dischert | ............... | 242/573.9 |
| 4,336,911 A * | 6/1982 | Fairchild | .............. | 242/423.1 |
| 4,666,102 A | 5/1987 | Colbaugh et al. | | |
| 4,726,179 A * | 2/1988 | Smith et al. | ............ | 57/129 |
| 5,261,625 A | 11/1993 | Lanoue | | |
| 5,564,645 A * | 10/1996 | Lissoni | ................ | 242/423.1 |
| 5,638,481 A * | 6/1997 | Arnett | .................. | 385/135 |
| 6,398,149 B1 * | 6/2002 | Hines et al. | ............ | 242/399 |
| 6,698,317 B1 * | 3/2004 | Machovsky | ............ | 81/124.2 |
| 6,745,971 B1 | 6/2004 | Renzoni | | |
| 6,786,669 B2 * | 9/2004 | Tsui et al. | ............. | 403/322.2 |
| 7,079,745 B1 * | 7/2006 | Weinert et al. | .......... | 385/135 |
| 2008/0011782 A1 * | 1/2008 | Sidman | .................. | 222/192 |
| 2008/0170831 A1 * | 7/2008 | Hendrickson et al. | ...... | 385/135 |
| 2008/0292261 A1 * | 11/2008 | Kowalczyk et al. | ...... | 385/135 |
| 2009/0074370 A1 * | 3/2009 | Kowalczyk et al. | ...... | 385/135 |

\* cited by examiner

*Primary Examiner*—Sang Kim
(74) *Attorney, Agent, or Firm*—Law Office of Leo Zucker; Michael A. Morra

(57) ABSTRACT

A spooling tool for paying out a fiber optic cable prewound on a spool region of a drop box or on an associated spool, when installing a cable at a user's premises. In one embodiment, the tool includes a base plate and a stud projecting from one side of the plate. An elongate arbor has one end secured to the stud in such a manner as to support the arbor perpendicular to the base plate. The arbor is dimensioned to pass through an axial passage in the box so that the box pivots on the arbor when the cable is unwound by an installer. A cap mechanism at the opposite end of the arbor retains the drop box on the arbor, and applies enough drag on the box to inhibit it from free wheeling on the arbor.

13 Claims, 5 Drawing Sheets

FIBER OPTIC RAPID SPOOLING TOOL

CROSS REFERENCE TO RELATED APPLICATION

This application claims priority under 35 U.S.C. §119(e) of co-pending U.S. Provisional Patent Application No. 60/945,611 filed Jun. 22, 2007, and entitled "Fiber Optic Rapid Spooling Tool".

BACKGROUND OF THE INVENTION

1. Field of the Invention

The present invention concerns a tool that facilitates paying out a cable from a spool or drum while the cable is installed at a user's premises.

2. Discussion of the Known Art

Installations of fiber optic cabling at a user's premises typically required winding a predetermined length of cable on a reel, and then pulling a free end of the cable off of the reel and down a riser shaft. The free end of the cable is then terminated in a building entrance box for connection with an outside cable from a service provider. It will be understood that such a procedure normally requires at least two technicians or installers, that is, one person to hold the reel as the cable is unwound, and another person to pull the cable down the shaft.

Commonly owned U.S. Provisional Patent Application No. 60/880,169 ('169 application) filed Jan. 13, 2007, and U.S. Utility patent application Ser. No. 11/728,785 ('785 application) filed Mar. 27, 2007, disclose a multi-dwelling unit (MDU) entrance or "drop" box wherein a fiber optic cable may be prewound about a spool or drum region of the box. The drop box also features an integral tube having a passage whose axis coincides with that of the drum region. Thus, an installer may insert a screwdriver or other elongate tool in the tube passage and, while holding the tool in one hand, use the other hand to pull the cable off of the drum region while the drop box pivots freely on the tool. All relevant portions of the mentioned '169 and '785 applications are incorporated by reference.

Whether the cable is prewound on the above mentioned drop box or on a separate spool or drum, installers typically must pull the cable around corners or between floors at the user's premises. Routing the cable away from the location of the drop box or spool therefore requires at least two persons so as to avoid undesirable bending or breaking of the cable or its fibers, i.e., one person to hold the box or spool in place as the cable unwinds, and one or more other persons to pull and route the cable carefully over a desired path at the premises. The typical installation process is therefore time consuming and labor intensive.

Accordingly, there is a need for a tool that enables a single installer to unwind a fiber optic cable easily from a spool or drop box at a user's premises, and to route the cable over a desired path away from the location of the spool or box without damaging the cable or the fibers it contains.

SUMMARY OF THE INVENTION

According to the invention, a spooling tool for paying out a desired length of cable from a cable drop box having a spool region, includes a base plate and an elongate arbor having a first end and a second end. The arbor is constructed and arranged to be secured to the base plate in the vicinity of the first end of the arbor, wherein the arbor is held substantially perpendicular to the base plate. The arbor is dimensioned for insertion through an axial passage in the drop box so that the box pivots about the arbor. A cap arrangement at the second end of the arbor includes a drag mechanism arranged to apply a frictional force on the box sufficient to inhibit the box from free wheeling on the arbor.

According to another aspect of the invention, a spooling tool for paying out a desired length of cable from a drop box or an associated spool on which the cable is wound, includes a base plate having a first major surface and a second major surface opposite the first major surface. A stud is fixed at a bottom end to the base plate and has a top end that projects a certain height above the first major surface of the plate. An elongate arbor has one end formed to engage the top end of the stud so that the arbor is supported substantially perpendicular to the base plate, and the arbor is dimensioned to be inserted through an axial passage in the drop box so that the box pivots on the arbor when a cable is unwound from the box or the associated spool. A cap mechanism is arranged at an opposite end of the arbor to retain the box and to apply a drag on the box sufficient to inhibit free wheeling of the box or the associated spool.

Other features and advantages of the invention will now be described in conjunction with the accompanying drawing and the appended claims.

DETAILED DESCRIPTION OF THE INVENTION

Figure 1:
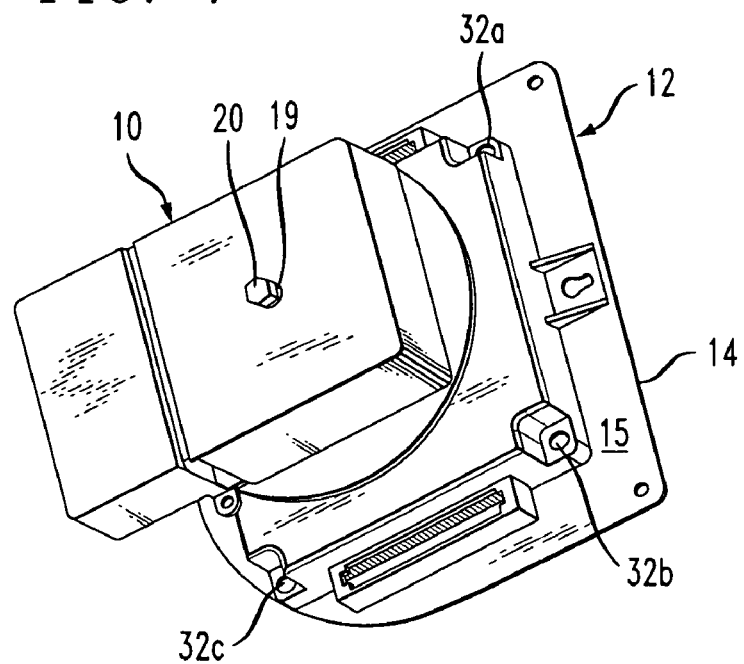
FIG. 1 is a perspective view of a fiber optic cable drop box operatively engaged with the inventive spooling tool, wherein portions of the tool's base plate and arbor are visible in the figure.
Figure 2:
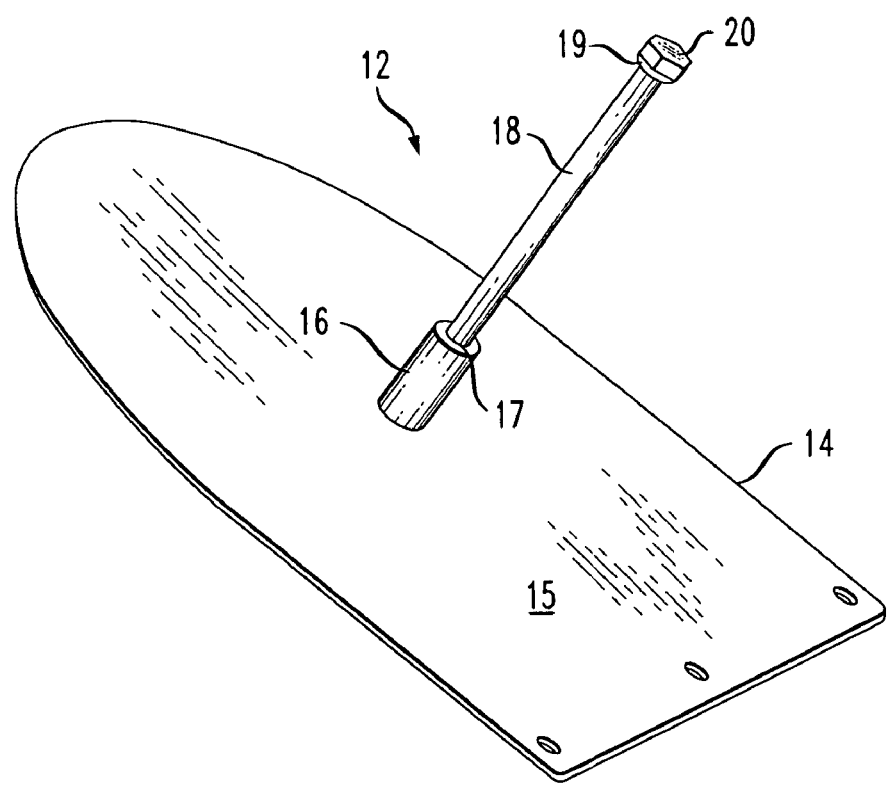
FIG. 2 is a perspective view of the base plate and the arbor operatively engaged with one another.

FIG. 1 shows a fiber optic cable drop box 10 such as, for example, the box of the mentioned '169 and '785 applications, wherein the box 10 is operatively supported on a spooling tool 12 according to the invention. FIG. 2 shows a base plate 14 of the tool 12, and an elongate arbor 18 dimensioned and formed to be inserted into an axial through passage that opens atop the drop box 10 in FIG. 1. Typical dimensions for one embodiment of the base plate 14 are given in inches in FIG. 4.

The base plate 14 may be generally "D" or rectangularly shaped and formed, for example, from zinc plated 16 gauge cold rolled steel (0.060 inch thick), aluminum, or equivalent rigid and durable sheet material. As shown in FIG. 2, a stud or post 16 has a bottom end that is fixed at a central location on an upper major surface 15 of the base plate 14. In the illustrated embodiment, the stud 16 has an axial bore that opens at a top end 17 of the stud. If the tool 12 is to be used with the drop box 10. in FIG. 1, the top end 17 of the stud 16 may project, e.g., about 1.25 inches from the upper major surface 15 of the base plate as seen in FIG. 2.

A lower end of the arbor 18 is dimensioned and formed for insertion in the bore in the top end 17 of the stud 16. For example, the lower end of the arbor 18 and the stud bore may be threaded so that the arbor 18 can engage the stud 16 firmly and be supported perpendicular to the upper major surface 15 of the base plate 14 as in FIG. 2.

Figure 3:
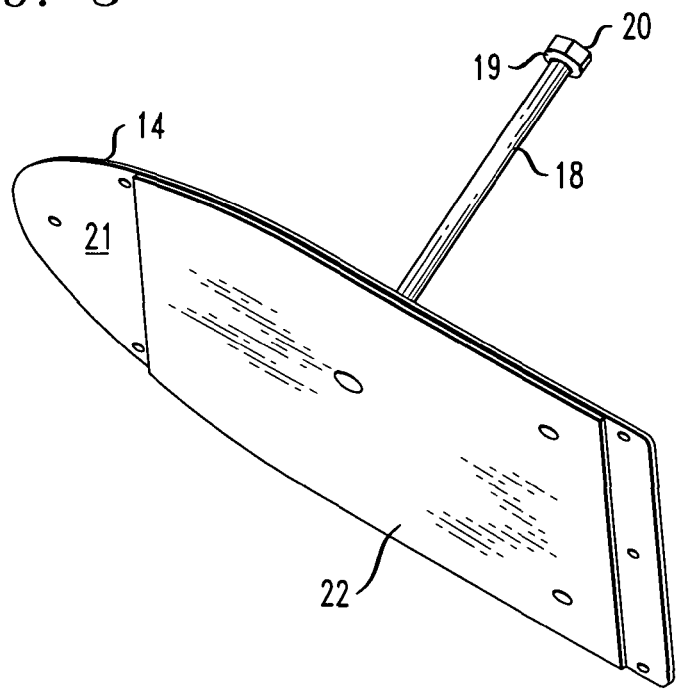
FIG. 3 is a perspective view from beneath the base plate in FIG. 2.

A cap mechanism 20, shown in FIGS. 1-3, is provided at an upper end of the arbor 18 and serves to retain the drop box 10 and, optionally, an associated cable spool attached to the box 10 (see FIG. 7), on the tool 12. An O-ring 19 or an equivalent compression element such as, e.g., a spring, is disposed on the side of the cap mechanism 20 facing the base plate 14. The ring 19 allows an installer to control the pulling force needed to unwind a cable from a drum region of the drop box 10, or from an associated cable spool, by tightening or loosening the threaded arbor 18 in the stud 16 thereby adjusting the amount of compression or drag exerted by the ring 19 directly against the box 10. Such drag inhibits the box 10 from spinning freely ("free wheeling") about the arbor 18 in the absence of a pull force on an unwound portion of the cable.

Figure 5:
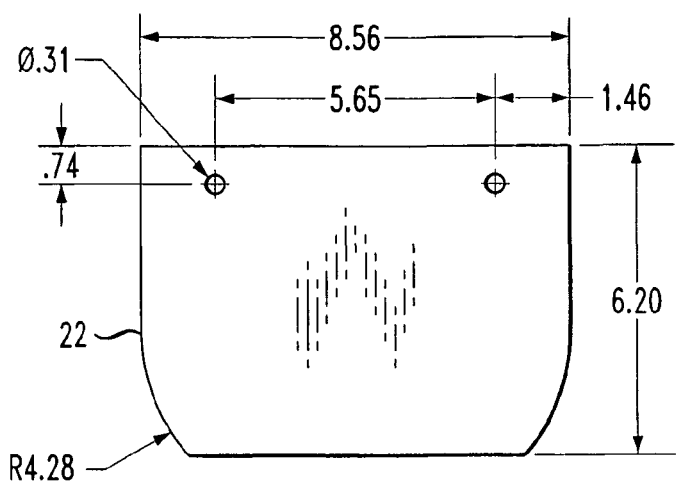
FIG. 5 is a plan view of a friction pad or layer applied on a bottom surface of the base plate in FIG. 3, including typical dimensions.

FIG. 3 shows a bottom major surface 21 of the base plate 14, and a pad or layer of friction material 22 (see FIG. 5) adhered on the surface 21. The material 22 may be cut, for example, from a 0.06 inch thick neoprene rubber sheet or equivalent friction material. Typical dimensions for the layer of friction material 22 are given in inches in FIG. 5. The material 22 affords an installer the option of unwinding and routing a desired length of cable from the drop box 10 (or a cable spool attached to the drop box) before mounting the box vertically on a wall or other structure at a user's premises.

Specifically, the base plate 14 may be placed on the floor near a location where the drop box 10 is to be mounted permanently at the premises. The box 10 is then placed horizontally on the base plate 14 so that the stud 16 is seated in a bottom surface of the box and is aligned with the axial passage that extends through the box. The arbor 18 is inserted vertically through the top opening of the axial passage to engage the stud, and thus acts as a spindle about which the box pivots as a cable is unwound from the drum region of the box. The friction material 22 then acts to restrain the base plate 14 from being dragged or sliding on the floor when an unwound portion of the cable is pulled remotely by an installer in order to route the cable over a desired path at a user's premises.

Figure 4:
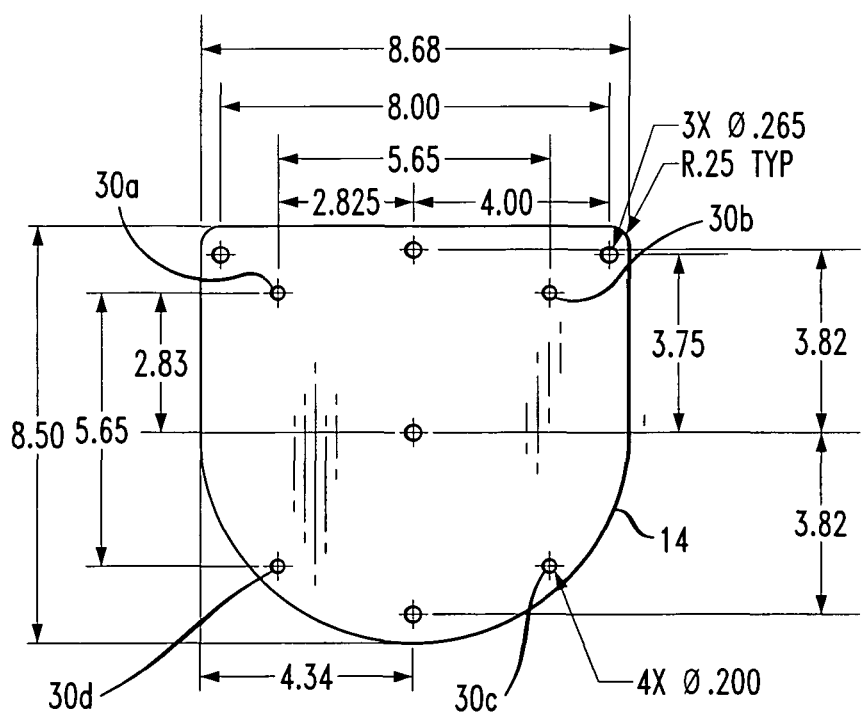
FIG. 4 is a plan view of the base plate, including typical dimensions.

As seen in FIG. 4, the base plate 14 has four holes 30a, 30b, 30c and 30d which are located on the plate and sized to register with corresponding mounting holes in the base of the associated drop box 10. Three of the base mounting holes, viz., 32a, 32b and 32c, are visible in FIG. 1. Accordingly, the hole pattern in the base plate 14 can be used as a template for marking points at which screws or other fasteners will enter a wall surface in order to mount the drop box 10 permanently at the premises.

Figure 6:
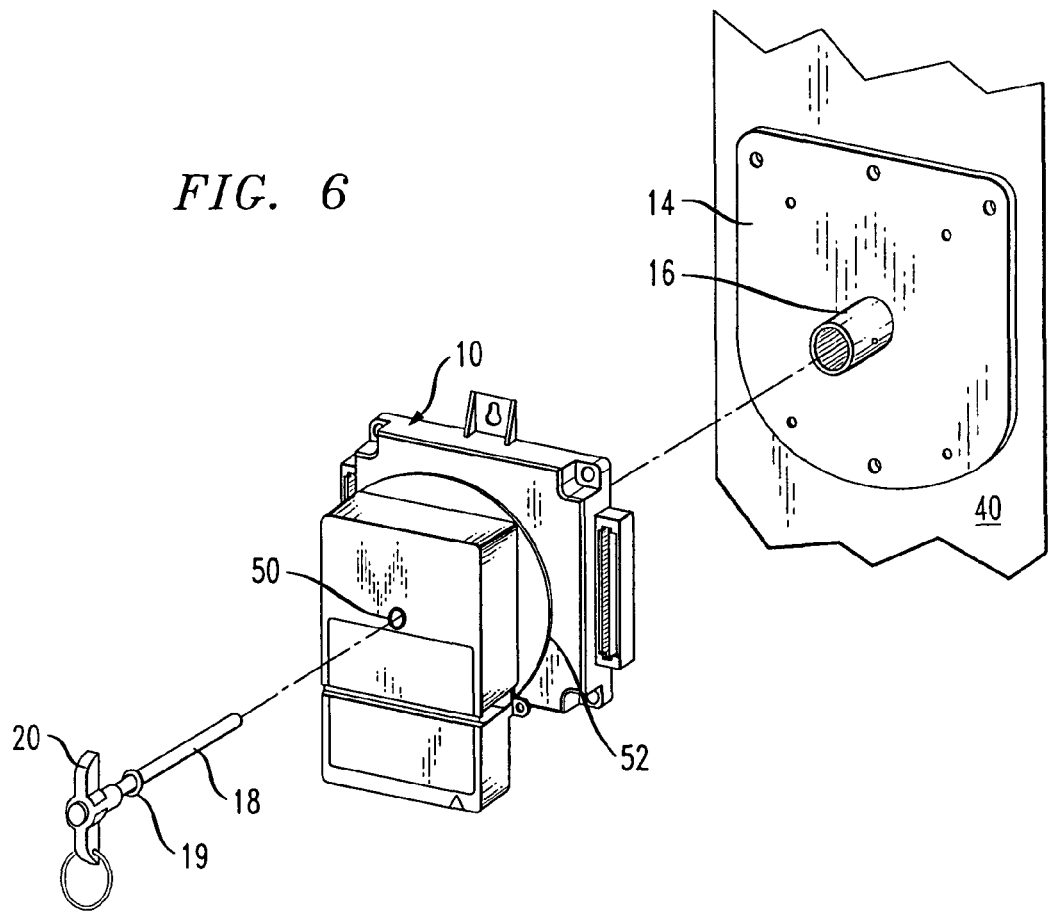
FIG. 6 shows an assembly of the inventive tool with the drop box in FIG. 1.

FIG. 6 illustrates an application of the inventive tool 12 with the drop box 10 in FIG. 1, wherein the base plate 14 of the tool is temporarily fastened against a vertical wall or other surface 40 at a user's premises. The box 10 is placed over the base plate 14 so that the stud 16 on the plate engages the box in alignment with the axial passage that extends through the box 10. The arbor 18 is inserted horizontally through a top opening 50 of the axial passage in the box 10 to engage the stud 16, and to act as a spindle about which the box pivots as a cable is unwound from a drum region 52 of the box. The cap mechanism 20 is tightened against the box 10 to impart enough drag to prevent the box from free wheeling on the arbor 18 when an unwound portion of the cable is suddenly pulled by an installer from a remote location to obtain an additional length of cable, or in the absence of any pull on the unwound portion of the cable.

Figure 7:
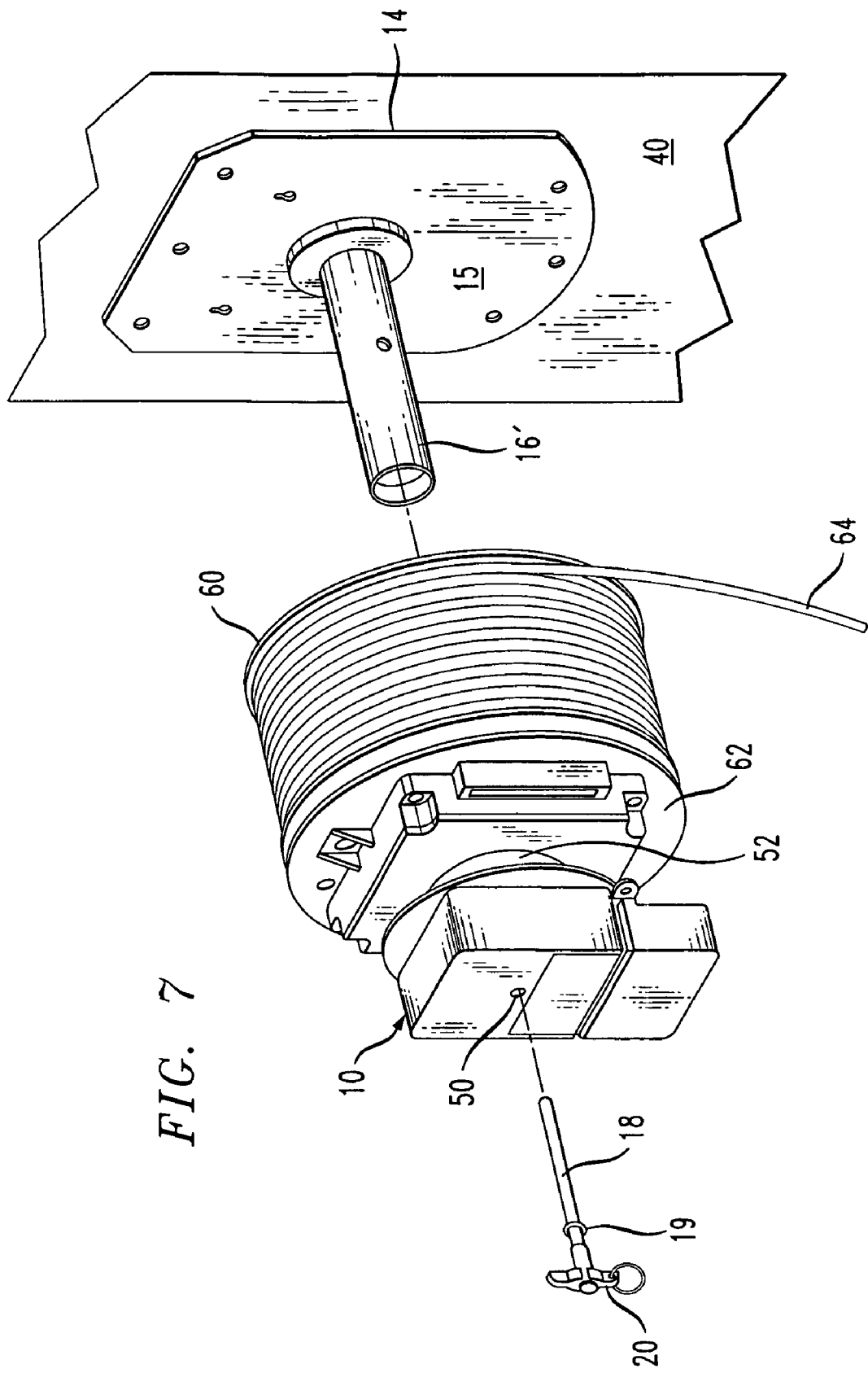
FIG. 7 is a view similar to FIG. 6, wherein the drop box is placed together with an associated cable spool on the inventive tool.

FIG. 7 is a view similar to FIG. 6, and shows another application of the tool 12 wherein the drop box 10 of FIG. 1 has an associated outboard cable spool 60 one end wall 62 of which is fixed to the bottom of the base of the box in alignment with the axial through passage in the box. Such an application may be desirable for installations that require a greater quantity of cable 64 than that which can be prewound on the drum region 52 of the box 10. In the FIG. 7 application, the height of the stud 16' above of the base plate 14 is sufficient to extend fully through an axial bore in the spool 60, and to engage the bottom of the drop box 10 in alignment with the axial passage that extends through the box. The arbor 18 is then inserted through the top opening 50 of the axial passage in the drop box to engage the stud 16'.

In FIG. 7, the arbor 18 acts as a spindle about which the drop box 10 pivots when the cable 64 is unwound from the spool 60, and the extended stud 16' acts as a spindle about which the spool 60 pivots in unison with the box 10. The cap mechanism 20 may be tightened against the box 10 to impart enough drag to prevent both the box 10 and its associated spool 60 from free wheeling in response to a sudden pull on an unwound portion of the cable, or while the cable is not being pulled by an installer. As shown in FIGS. 6 and 7, the arbor 18 and the cap mechanism 20 may comprise a commercially available ball pin quick release device. The compression element 19 may comprise one or more washers, and/or an integrated spring mechanism. Alternatively, the element 19 may be omitted, and the desired tension or drag applied directly by the cap mechanism 20 once the arbor 18 engages the stud 16 (or 16').

Figure 8:
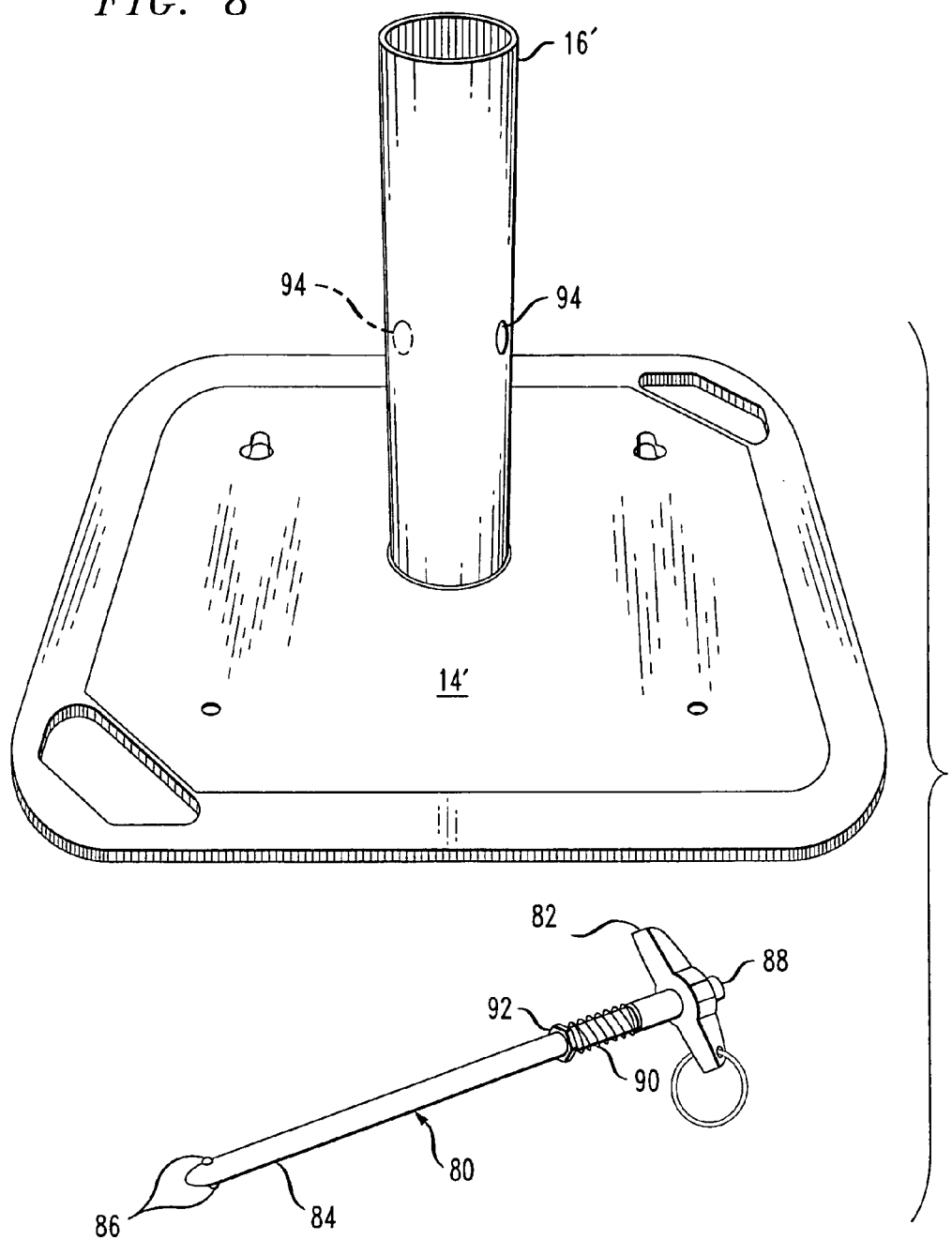
FIG. 8 is a perspective view of another embodiment of the inventive tool.

As shown at the bottom of FIG. 8 and as mentioned above, the cap mechanism 20 and the arbor 18 may comprise a ball pin quick release device 80. The device 80 has a handle 82 that is joined to one end of a shaft 84, as seen at the lower right in FIG. 8. The shaft 84 has a pair of locking balls or pins 86 that protrude radially from its circumference at the opposite end of the shaft. The pins 86 can be retracted manually by depressing a button 88 atop the handle 82. A spring 90 and a flat washer 92 are disposed on the device shaft 84 next to the handle 82.

In the embodiment of FIG. 8, the base plate 14' of the inventive tool is generally rectangular, and a hollow cylindrical stud 16' is supported at the center of and perpendicular to the base plate. The stud 16' may, for example, be fastened to or be removed from the base plate 14' by threading its bottom end onto or off of a mating stand-off (not shown) that is welded or otherwise fixed to the base. Thus, the stud 16' may be selected from among a number of studs of different lengths either to ensure that a particular drop box is properly seated on the base plate as depicted in FIG. 6, or to act as a spindle about which the associated cable spool 60 can pivot as in FIG. 7. Diametrically opposite holes 94 are formed in the wall of the stud 16' in FIG. 8, so that the shaft 84 of the release device 80 can be inserted through the holes 94 and act as a lever for either tightening or loosening the stud 16' on the base plate 14'.

Once a cable drop box or a drop box with an attached cable spool is seated on the stud 16', the distal end of the release device shaft 84 is inserted through the passage opening 50 atop the drop box, and is urged into the bore opening in the stud 16' while the user depresses the handle button 88. When the washer 92 on the shaft 84 contacts the top of the drop box and the spring 90 urges the washer 92 against the box to impart a certain drag, the button 88 is released and the locking pins 86 at the distal end of the shaft deploy radially outward to engage, e.g., an annular ring or groove on the inner circumference of the stud 16'. Thus, the shaft 84 is locked from being withdrawn axially out of the stud 16' while the desired drag is applied to the drop box and any associated cable spool.

As disclosed herein, the inventive spooling tool allows a fiber optic cable to be unwound from a drop box or an associated spool on an as-needed basis by a single installer, and without causing damage to the cable. The tool keeps the cable organized and features a mechanism that controls the speed of cable pay out and inhibits free wheeling of the drop box or spool on the tool. The base plate of the tool may also be configured to provide an installer with mounting and template information to aid in locating the drop box at the user's premises, and to prevent interference with surrounding objects while the cable is unwound.

While preferred embodiments of the invention are described herein, those skilled in the art will understand that various modifications may be made without departing from the spirit and scope of the invention as defined by the appended claims. For example, The arbor 18 may be fixed initially at a bottom end to the base plate 14 such as, for example, via a press fit into an opening in the plate, welding, or nut fasteners. The arbor may then have such a length so that after a drop box is set to pivot on the arbor, a top end of the arbor protrudes a sufficient distance above the box to allow a drag mechanism similar to the cap mechanism 20 to be threaded, press fit or otherwise clamped to the top end of the arbor after placing one or more compression elements 19 (e.g., a spring and a washer) on the arbor.

We claim:

1. A spooling tool for paying out a desired length of cable from a cable drop box having an axial through passage that opens atop the drop box and from an associated outboard spool an end wall of which is fixed to a bottom of the drop box so that an axial bore in the spool is aligned with the axial passage through the box, the tool comprising:

a base plate having a first major surface, and a second major surface opposite the first major surface;

a stud having a bottom end joined to the base plate and having a top end that projects a certain height above the first major surface of the base plate, wherein the top end of the stud is arranged so that a bottom surface of the cable drop box seats on the stud, and the stud is aligned with the axial passage through the box;

an elongate arbor having a first end dimensioned and formed for insertion through the top opening of the axial through passage in the drop box, and to engage the stud so that the arbor is supported substantially perpendicular to the base plate and the drop box pivots on the arbor when the cable is unwound from the drop box; and a cap mechanism arranged at a second end of the arbor opposite the first end for retaining the drop box on the arbor, and for applying a sufficient drag on the box to inhibit free wheeling of the box on the arbor either while the cable is being unwound or in the absence of a pull on an unwound portion of the cable;

wherein the stud projects a sufficient height above the first major surface of the base plate to extend fully through the axial bore in the associated spool and to seat the bottom of the drop box at the top end of the stud so that when the arbor engages the stud, the arbor acts as a spindle about which the drop box pivots when the cable is unwound from the spool and the spool pivots about the stud.

2. A spooling tool according to claim 1, wherein the stud has an axial bore that opens in the top end of the stud for receiving the first end of the arbor.

3. A spooling tool according to claim 2, wherein the bore in the stud and the first end of the arbor are threaded.

4. A spooling tool according to claim 2, wherein the arbor has locking pins arranged at the first end of the arbor, and including an annular ring or groove on the inner circumference of the bore in the stud for receiving the locking pins of the arbor.

5. A spooling tool according to claim 4, wherein the arbor comprises a ball pin quick release device including a shaft having a handle at one end, and said locking pins are arranged at an opposite end of the shaft.

6. A spooling tool according to claim 5, wherein the cap mechanism comprises a spring disposed on the shaft of the quick release device next to the handle.

7. A spooling tool according to claim 5, wherein the cap mechanism comprises a washer disposed on the shaft of the quick release device next to the handle.

8. A spooling tool according to claim 5, wherein the stud has holes in its circumference for receiving the shaft of the release device to allow the shaft to act as a lever for tightening or loosening the stud on the base plate.

9. A spooling tool according to claim 1, including a pad or layer of friction material applied on the second major surface of the base plate for restraining the base plate from sliding on a floor surface when an unwound portion of the cable is pulled to unwind additional cable from the drop box or from the associated spool.

10. A spooling tool according to claim 9, wherein the pad or layer of friction material comprises rubber.

11. A spooling tool according to claim 1, wherein the base plate has a number of holes formed in the plate for registration with corresponding mounting holes in an associated cable drop box.

12. A spooling tool according to claim 1, wherein the bottom end of the stud is constructed and arranged to be removably fastened to the base plate.

13. A spooling tool according to claim 12, including a number of studs of different lengths, wherein one of the studs is selected to be fastened to the base plate to ensure a particular drop box is properly seated, or to act as a spindle about which an associated cable spool can pivot.

* * * * *